Dec. 6, 1938.   F. S. MARCELLUS   2,139,509
RECORDER
Filed Sept. 12, 1936

Inventor:
Fredrick S. Marcellus,
by Harry E. Dunham
His Attorney.

Patented Dec. 6, 1938

2,139,509

UNITED STATES PATENT OFFICE 2,139,509

RECORDER

Fredrick S. Marcellus, Scotia, N. Y., assignor to General Electric Company, a corporation of New York Application September 12, 1936, Serial No. 100,528

2 Claims. (Cl. 128—2.05)

My invention relates to indicating and curve drawing instruments and its principal object is providing a highly sensitive method and apparatus for indicating and recording very minute deflections and pulsations.

An object of my invention is to provide compact, accurate, sensitive apparatus and an improved method for indicating and recording pulse and change in blood pressure of human beings and to provide an improved method of studying circulation in the extremities of the human body, particularly in certain vascular diseases. Other and further objects and advantages will become apparent as the description proceeds.

The features of the invention which are believed to be novel and patentable will be pointed out in the claims appended hereto. The invention will be understood more readily from the following detailed description when considered in connection with the accompanying drawing in which Fig. 1 is a schematic diagram illustrating a pulse recorder forming an embodiment of my invention, and Fig. 2 is a diagram illustrating in part a temperature recorder forming another embodiment of my invention.

Figure 1:
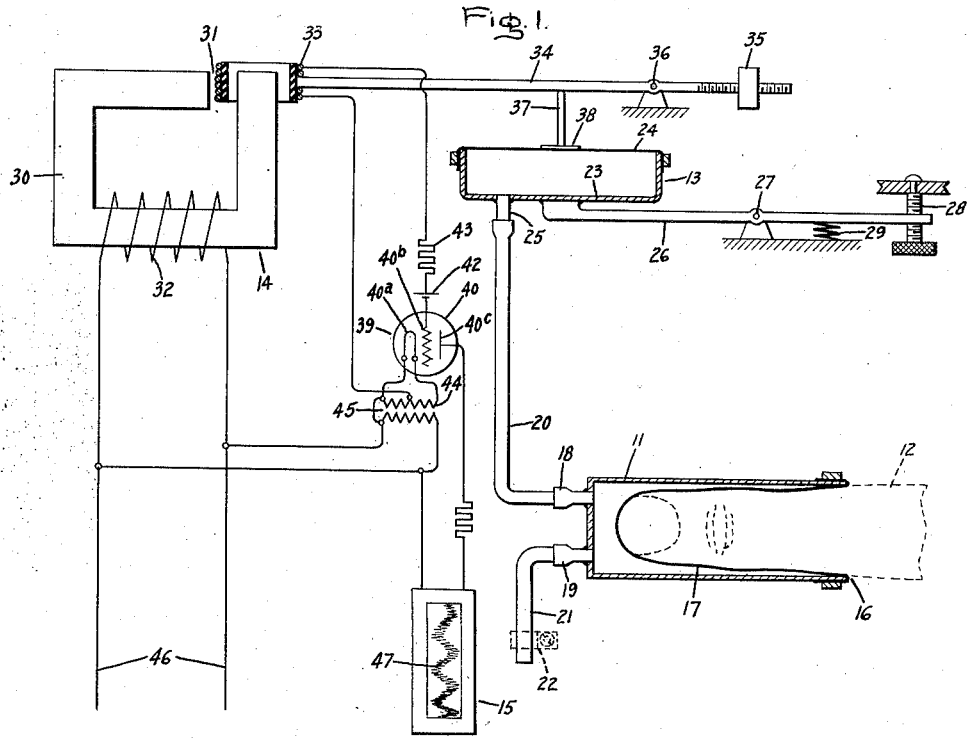
Figure 2:
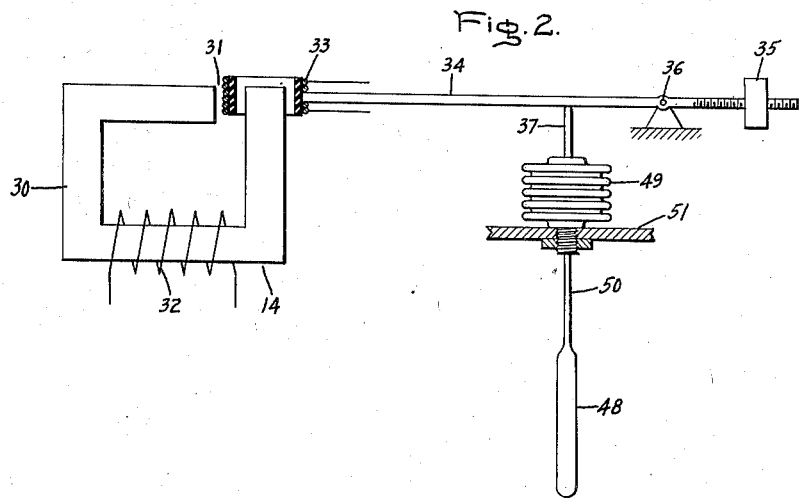

Referring now more in detail to the drawing, in which like reference characters are utilized to designate like parts throughout, I have shown in Fig. 1 a pulse recorder having a cup 11 for receiving an extremity of the human body such as a finger 12 or a toe, an air tambour 13 for reproducing pressure impulses produced by the expansion and contraction of arteries in the finger 12, a movable coil transformer 14 for converting the pressure impulses into electrical impulses and a curve drawing instrument 15 for recording variation in voltage produced by the transformer 14, thus graphically recording instantaneous variations in blood pressure.

The cup 11 is composed of metal, a molded composition, or other suitable relatively rigid material. The mouth 16 of the cup 11 is closed by a sac 17 extending into the cup and composed of a flexible, preferably elastic, material, such as soft rubber. The cup 11 is also provided with a pair of tubular outlets 18 and 19 serving as tube connections. A length of tubing 20 is attached to the tube connection 18 for transmitting pressure impulses to the tambour 13 and a piece of tubing 21 is attached to the tube connection 19 for admitting air to the cup 11. The tubing 21 carries a shut-off clamp 22 or other suitable means are provided for closing the tubing 21.

The air tambour 13 consists of a vessel 23 closed at the top by a diaphragm 24 and has a tube connection 25 for attachment to the length of tubing 20 communicating with the cup 11. If desired, the tambour 13 may be adjustably mounted by attaching it to one end of a lever 26 pivoted at 27 and having an adjusting screw 28 threaded into the other end of the lever. To relieve the force exerted on the threads of the screw 28, a tension spring 29 balancing part of the weight of the tambour 13 may be provided.

The transformer 14 comprises a core 30 having an air gap 31, a stationary primary winding 32 linking the core 30 and a movable secondary winding 33 partly within the air gap 31 so as partially to link the core 30, that is, so as to link only a part of the magnetic flux of the transformer 14, depending upon the position of the winding 33. A pivoted arm 34 is provided, carrying the winding 33 and an adjustable balancing weight 35 on either side of a pivot 36. A rod 37, secured to the diaphragm 24 by means of a reinforcing pad or plate 38, is provided for transmitting motion of the diaphragm 24 to the winding 33 indirectly through the pivoted arm 34.

The transformer secondary winding 33 may be connected either directly to a curve drawing instrument or preferably through the medium of an amplifier 39. The amplifier 39 may be of the vacuum tube type with an evacuated envelope 40 enclosing a cathode 40a, a control electrode 40b, and an anode 40c. The electrode 40b is connected in series with a negative grid bias battery 42, a resistor 43, and the winding 33, to the cathode 40a, or to the secondary winding 44 of a cathode heating transformer 45. The curve drawing instrument 15 is connected in series with the anode 40c, and a common source of alternating current 46 may be provided for energizing the transformers 14 and 45 and the vacuum tube amplifier 39. Although I have shown the use of a curve drawing instrument 15 by way of illustration, it will be understood that my invention is not limited to this precise arrangement but obviously embraces the use of any suitable current responsive devices, such as indicating or contact-making instruments, for example.

Before taking a record of the condition of a patient whose finger 12 has been placed in the cup 11, I consider it desirable to admit enough air under pressure through the tube 21 to bring the average deflection of the instrument 15 up to approximately half scale. The tube 21 is then, of course, closed by means of the clamp 22.

It will be apparent that variations in blood pressure causing expansion and contraction of the arteries will cause expansion and contraction of the sac 17, producing variations in the volume and pressure of the air confined in the cup 11. Such pressure variations will be transmitted to the tambour 13, causing deflection of the diaphragm 24 and variation in position of the winding 33. Since the air gap 31 and the winding 33 are both relatively narrow, slight variation in position of the winding 33 will result in substantial variations in the flux threaded by the winding 33, thus substantially varying the voltage induced therein. Such voltage variations are then amplified and a record is produced by the instrument 15.

From an inspection of the record curve 47 produced by the instrument 15, it will be evident that there are major and minor cyclic variations as well as irregular noncyclic variations in blood pressure. Cyclic variation due to breathing and heart beat can of course be detected, together with certain other natural variations. The relative amplitude and frequency of these variations and the presence of irregularities and unnatural variations afford the physician valuable statistical data in determining the condition of health of the patient. The apparatus also facilitates quantitive studies, hitherto impossible, of the effect of various treatments on patients and facilitates studies of the subconscious responses of persons subjected to various conditions.

In Fig. 2 I have disclosed an arrangement for studying a patient's condition by recording minute variations in his temperature instead of his blood pressure and of course the apparatus is equally valuable for determining temperature variations in industrial processes. In the apparatus of Fig. 2, the blood pressure cup 11 and air tambour 13 of Fig. 1 have been replaced by an air-thermometer bulb 48 and a bellows 49 with tubing 50 joining the two. The bellows 49 is supported by a stationary portion 51 of the apparatus and variations in temperature of the bulb 48 cause variation in pressure and volume of air or gas therein, so as to expand or contract the bellows 49 from which the motion is transmitted by the rod 37 to the arm 34, as in Fig. 1.

I have herein shown and particularly described certain embodiments of my invention and certain methods of operation embraced therein for the purpose of explaining its principle and showing its application but it will be obvious to those skilled in the art that many modifications and variations are possible and I aim, therefore, to cover all such modifications and variations as fall within the scope of my invention which is defined in the appended claims.

What I claim as new and desire to secure by Letters Patent of the United States is:

1. A pulse indicator, comprising in combination a cup for receiving an extremity of the body with a flexible sac therein shutting the mouth of the cup and means responsive to variations in pneumatic pressure, said cup having an opening with a tube connection to said pressure responsive means.

2. In apparatus for indicating minute movements comprising a core composed of magnetizable material having a straight portion and a return path portion extending from one end of the straight portion to a point spaced from a side of said straight portion at the other end thereof to form an air gap, a primary winding linking said core, and a secondary winding around the straight portion of said core, for connection to current responsive apparatus, said secondary winding being mounted to move along said straight portion in response to movements to be indicated, being positioned partly within and partly beyond said air gap, and having an axial length greater than the extent of movements to be indicated by the apparatus.

FREDRICK S. MARCELLUS.